United States Patent [19]
Porter

[11] 3,938,783
[45] Feb. 17, 1976

[54] METHOD FOR CONTINUOUS MIXING OF FOAM MATERIALS

[75] Inventor: Lawrence C. Porter, Palos Verdes Peninsula, Calif.

[73] Assignee: The Upjohn Company, Kalamazoo, Mich.

[22] Filed: Mar. 27, 1973

[21] Appl. No.: 345,297

Related U.S. Application Data
[63] Continuation of Ser. No. 85,639, Oct. 30, 1970, abandoned.

[52] U.S. Cl. ................................ 259/7; 23/252 R
[51] Int. Cl.² .......................................... B01F 7/18
[58] Field of Search ..................... 259/7, 8, 23, 24; 23/252 R

[56] References Cited
UNITED STATES PATENTS

| | | | |
|---|---|---|---|
| 1,792,059 | 2/1931 | Altwegg | 259/7 |
| 3,012,977 | 12/1961 | Wilson | 259/8 |
| 3,438,742 | 4/1969 | Grunewald et al. | 259/8 X |
| 3,471,131 | 10/1969 | Fritzweiler et al. | 259/8 |
| 3,482,822 | 12/1969 | Krizak | 259/8 |

*Primary Examiner*—Daniel Blum
*Assistant Examiner*—Philip R. Coe
*Attorney, Agent, or Firm*—Denis A. Firth; John Kekich

[57] ABSTRACT

Methods and apparatus are disclosed for continuous mixing of formulations for urethane products. A hydroxyl mixture and isocyanate, the major foam components, are supplied to a mixer. In the mixer, the components are mixed by transverse shearing and agitation means. The degree of agitation is varied along the length of the mixer, which runs at a constant speed, by varying the shearing pin configuration. The flow path through the mixer is arranged to control pressure on the fluid as well as minimize the tendency of internal foam build-up to occur.

3 Claims, 12 Drawing Figures

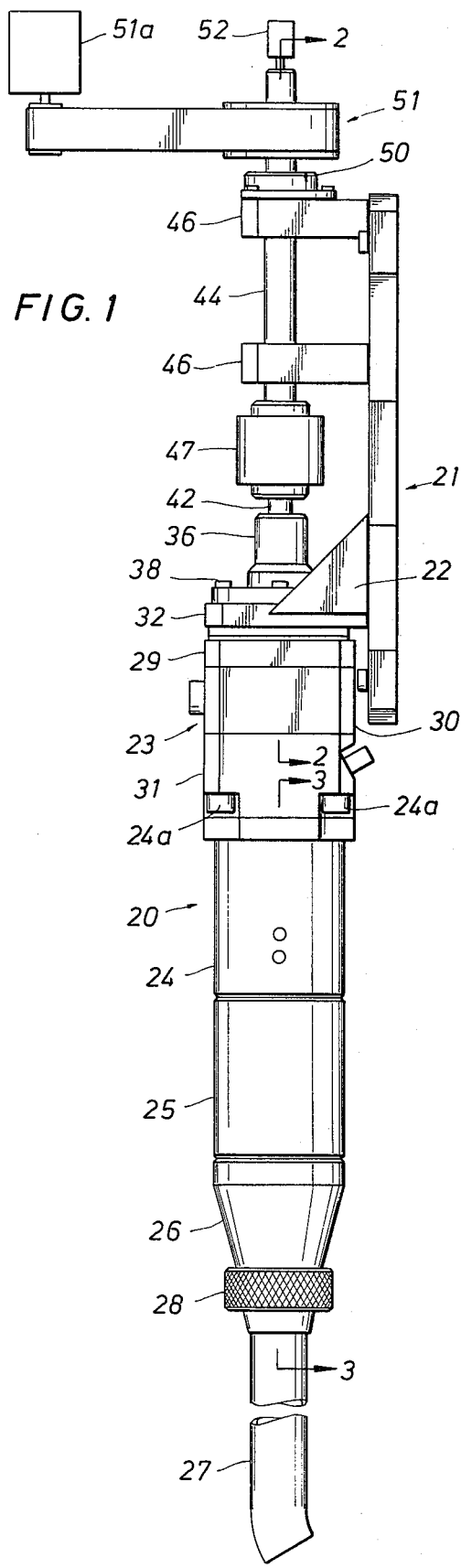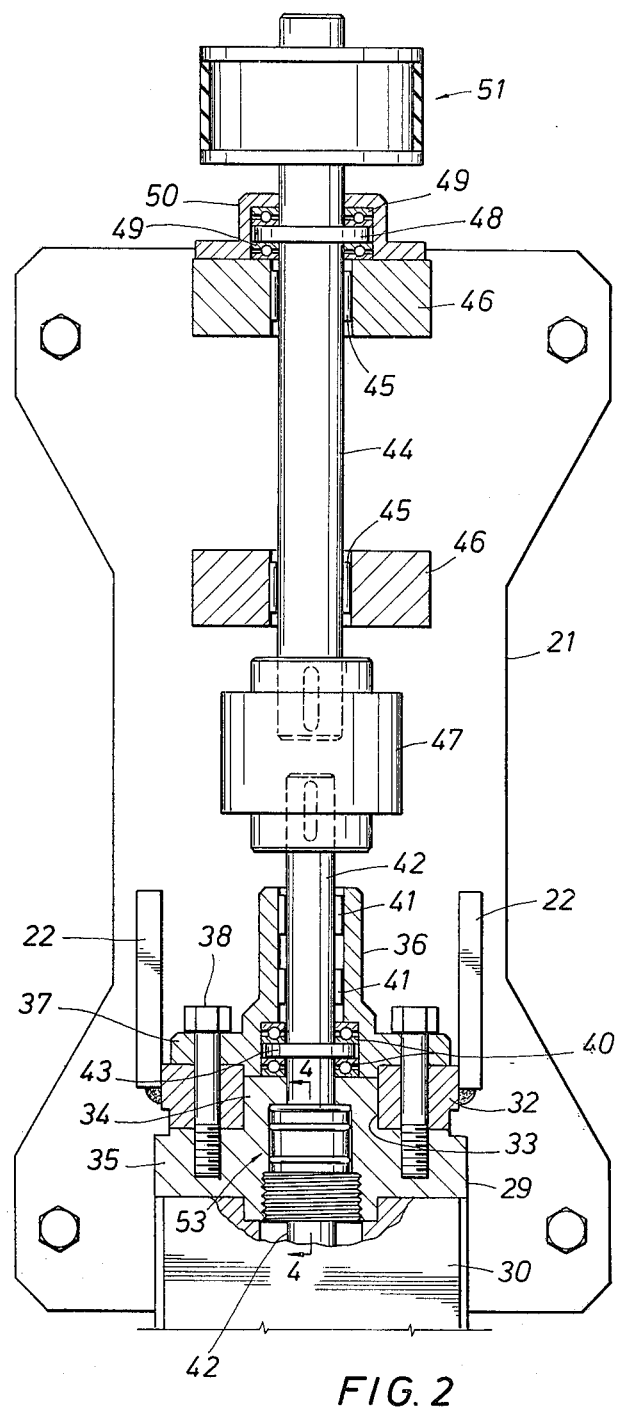

U.S. Patent   Feb. 17, 1976   Sheet 2 of 4   3,938,783
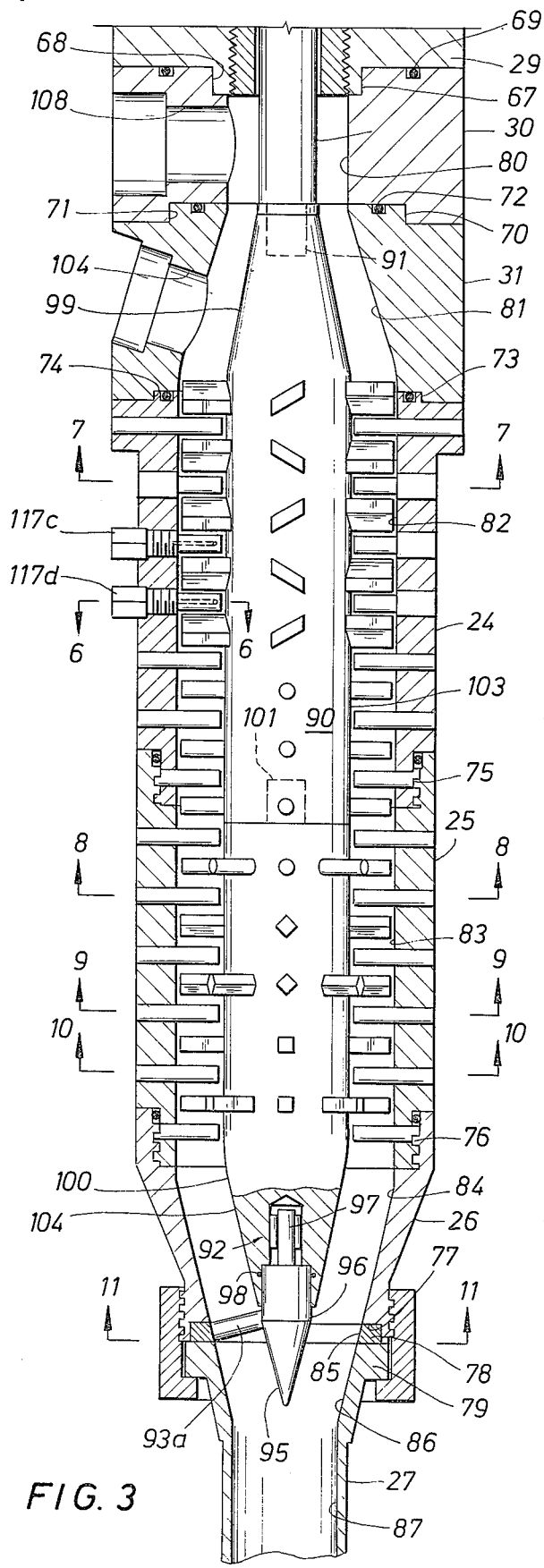
FIG. 3
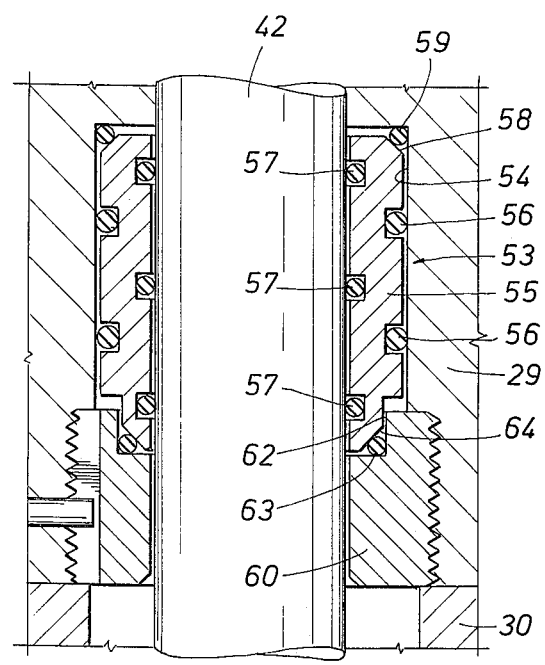
FIG. 6
FIG. 4
Lawrence C. Porter
INVENTOR
BY FIDLER & BARD
ATTORNEYS Lawrence C. Porter
INVENTOR

BY FIDLER & BARD

ATTORNEYS

METHOD FOR CONTINUOUS MIXING OF FOAM MATERIALS

This is a continuation of application Ser. No. 85,639, filed Oct. 30, 1970, and now abandoned.

BACKGROUND OF THE INVENTION

This invention relates to improved methods for producing urethane foam and the like and, more particularly, relates to improved methods for mixing liquid reactants for the production of foam.

One of the techniques for the production of urethane foam is to continuously mix reactive materials while continuously pouring them. This, of course, involves the need for providing a continuous flow of reactive mixture from a discharge nozzle at suitable volumes with proper mixing so that the deposited mixture reacts to provide an acceptable product.

In continuous molding of rigid foam, a reactive mixture is deposited on a moving conveyor at the input side of a tunnel mold and, as the reaction and foaming occur, the mixture expands and is defined in configuration by the cross-section of the tunnel mold and solidifies into a predetermined configuration. The quality of the resulting product is heavily dependent upon the quality of the mixing of the materials which are deposited for the reception by the mold.

In continuous molding of flexible foam, a reactive mixture is deposited on a moving conveyor at the input side of a U-shaped form, and, as the reaction and foaming occur, the mixture expands and is defined by the cross-section of the form.

There are, of course, other types of foam molding other than with a continuously moving conveyor. In almost all instances, proper mixing is essential to the formation of a good product.

As noted heretofore, urethane foam products can be produced by a number of techniques and can be either rigid or flexible. The present invention is principally concerned with a mixer for high volume, short time and intimately mixed throughputs where the chemical components are supplied to the mixer.

The raw materials used to produce foams typically consist of a di- or polyfunctional isocyanate, a polyfunctional hydroxyl material, a blowing agent, catalysts, cell size regulators, surfactants, and sometimes fillers or additives to obtain special properties. For the production of rigid foams, a relatively viscous hydroxyl compound is employed, and the objective is to obtain thorough mixing and dispersion of the various ingredients; the chemicals are such that about ninety percent of the cells in the foam product are closed. On the other hand, for flexible foams the polyester and polyether hydroxyl compounds are much less viscous, and the cells in the foam product are substantially all open. Obviously, viscosity of the chemical ingredients plays an important part in mixing and the likelihood of obtaining a thorough mixing action. The mixing head is supplied with a preblended mixture of hydroxyl, catalyst, coloring and acid which do not produce the foaming reaction. The other main mixture supplied to the mixer head is the isocyanate. Thus, the function of the mixing head is to blend the isocyanate and hydroxyl mixtures as quickly and thoroughly as possible to provide the reactive mixture. In this system, it is necessary to use the preblended mixture as soon after preblending as possible, since chemical reactions can occur.

In U.S. Pat. No. 3,482,822, a mixing head is illustrated which has some features in common with the present invention. In the U.S. Pat. No. 3,482,822, a preblended hydroxyl mixture was combined with an isocyanate, and mixing of the isocyanate and preblended mixture were accomplished by intermeshing pins on the barrel and a whipper. This was highly satisfactory for certain formulations but lacks a controlled and proper mixing for faster reaction formulations. In any event, this head did not meet the entire set of problems posed by foam formulations.

To mix compounds for flexible foam, heretofore it has been necessary to use a high pressure injection system for the ingredients in the order of 2000 psi. The ingredients are injected into a mixing chamber through an injection nozzle system to provide a finely atomized, high velocity stream for mixing and dispersion purposes. This system obviously has drawbacks. With the present invention, relatively low pressure mixing of compounds for flexible foam can be accomplished.

The mixing head can have outputs from 90 to 600 pounds/minute and typically traverses a moving conveyor at right angles while the liquid is laid down in a pattern of nearly parallel lines which merge before creaming. Upon mixing, the reaction begins immediately, and a foam rise can start at as little as two seconds after mixing (and even faster reactions are possible) and be completed within 1 to 2 minutes. Obviously, therefore, there is little time available for mixing. However, one of the most significant factors in producing good foam is proper mixing, particularly to handle dispersion of the vaporizing liquid and complex systems involving more than one reactant to obtain very highly cross-linked systems. A part of the difficulty in mixing the components for a urethane foam stock is the fact that some of the constituents are immiscible with one another, and others produce undesired reactions if not properly combined.

SUMMARY OF THE INVENTION

The advantages of the present invention are obtained principally with a mixer having a cylindrical interior configuration and a central whipping means which jointly define an annulus or flow passage for flow of constituents therethrough. The mixing is accomplished by transverse shearing members on a whipper body and the housing. By controlling the relative configuration of the whipping members, varying degrees of agitation or mixing are obtained along the flow path.

In the preblending operation, the resin (polyhydroxyl) is first mixed with catalysts, surfactants, etc. The mixture is continuously supplied to a mixer section where isocyanate is combined with the mixture in an expanding chamber. Thereafter, violent mixing of the isocyanate and resin mixture with one another is obtained by oppositely inclined, transverse blades in horizontal rows which straddle transverse pins in a housing, thereby transversely shearing and mixing the liquids. The oppositely inclined blades cancel out the turbine effect of the blades and also provide for a constriction and expansion of space between the turbine blades and the pins in the housing so that a thorough intermixing is obtained.

To produce varying degrees of mixing, a pin configuration which is cylindrically shaped is used for less violent mixing because a cylindrically shaped pin will generate a lesser amount of turbulence in mixing, and therefore a fairly mild mixing is initially performed.

Subsequently, along the flow path, rectangularly shaped pins with their diagonals aligned with the axis of the whipper introduce an intermediate mixing intensity and, subsequent to this, square shaped pins are employed to introduce a more violent degree of mixing before discharge of the materials from the mixer. The configuration of the flow path is controlled to minimize internal foam build-up.

In another aspect of the present invention, it is desired to provide a mechanical floating seal which will protect against scoring or abrasion of the rotative surfaces and therefore enhance and lengthen the life of the equipment.

These and other features of the present invention will be further described or will become apparent in the following detailed description wherein reference is made to the figures in the accompanying drawings, as follows:

FIG. 1 is an overall view of a mixing head and mounting structure therefor in accordance with the present invention.

FIG. 2 is a view in cross section taken along line 2—2 of FIG. 1.

FIG. 3 is a view in cross section taken along line 3—3 of FIG. 1.

FIG. 4 is a view in cross section taken along line 4—4 of FIG. 2.

FIG. 6 is a view in cross-section taken along line 6—6 of FIG. 3.

Figure 5:
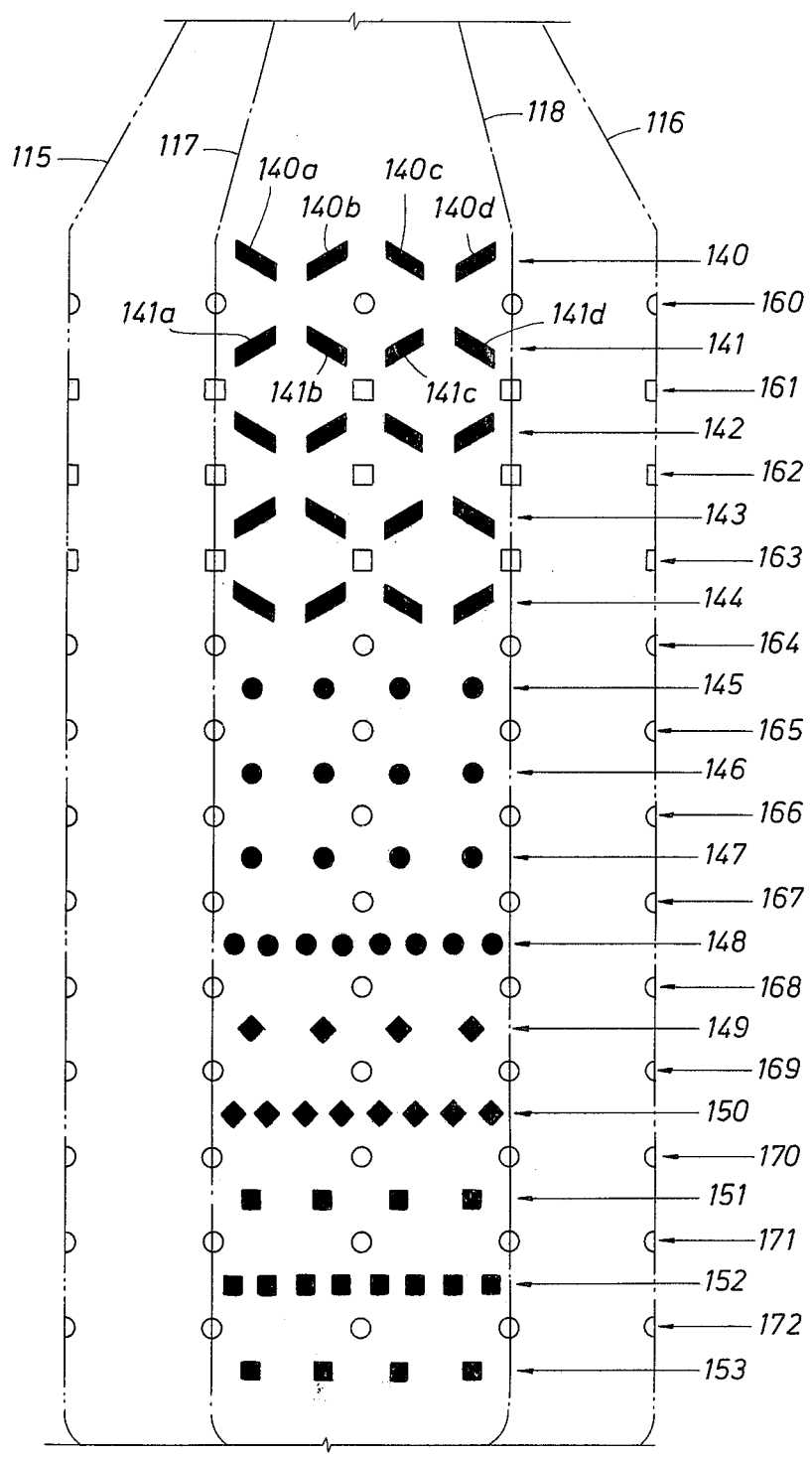
FIG. 5 is a plan view of the surfaces of the mixer and whipper body suspended in the plane of the drawing.
Figure 7:
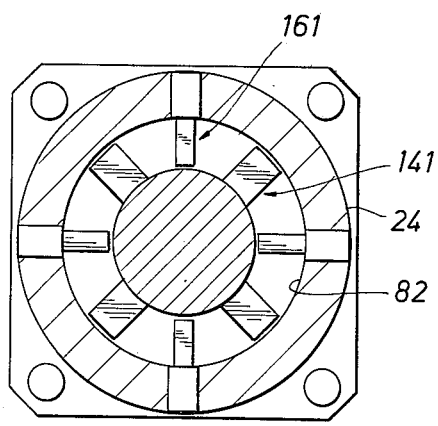
FIG. 7 is a view in cross-section taken along line 7—7 of FIG. 3.
Figure 8:
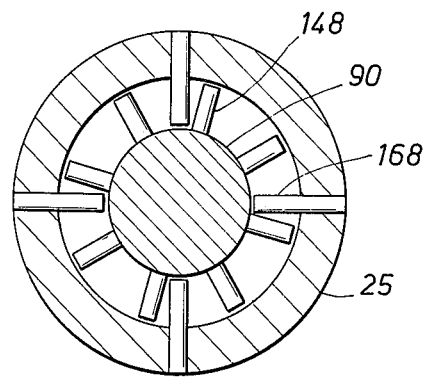
FIG. 8 is a view in cross-section taken along line 8—8 of FIG. 3 and FIG. 2B.
Figure 9:
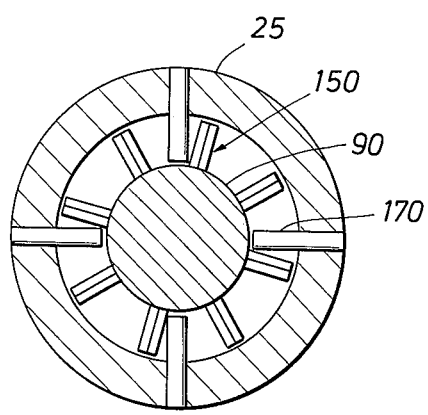
FIG. 9 is a view in cross-section taken along line 9—9 of FIG. 3.
Figure 10:
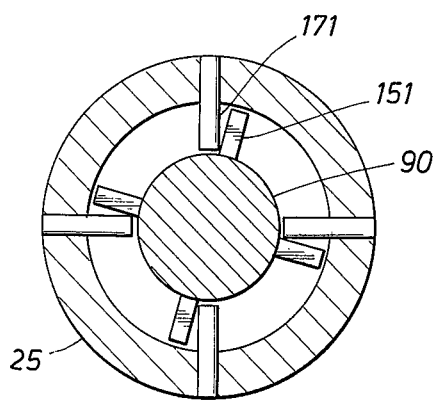
FIG. 10 is a view in cross-section taken along line 10—10 of FIG. 3.
Figure 11:
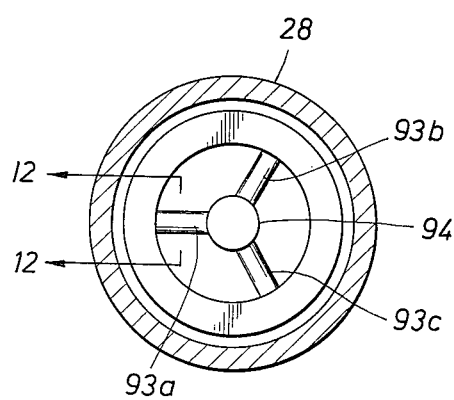
FIG. 11 is a view in cross-section along line 11—11 of FIG. 10.
Figure 12:
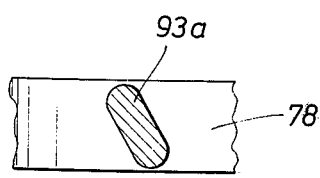
FIG. 12 is a view in cross-section along line 12—12 of FIG. 11.

Referring now to FIG. 1, a mixing nozzle 20 is illustrated as attached to a mounting bracket 21 by a mounting means which includes triangularly shaped supporting blocks 22 welded to the bracket 21. The bracket 21 is, of course, adaptable for attachment to a traverse cradle or the like in a foam production system so that it may be moved transversely or vertically as desired. The mixer 20 generally consists of a port block section 23, an upper mixer barrel 24, a lower mixer barrel 25, a barrel adapter 26 and a discharge nozzle 27 which is coupled to a barrel adapter by an adapter nut 28. The port block section 23 includes an upper sealing block 29, a middle port block 30 and a lower port block 31.

As shown in FIG. 2, the mounting means includes the blocks 22 and a transverse block member 32 welded to the blocks 22. The block member 32 has a cylindrical opening 33 which receives a cylindrical portion 34 of the upper sealing block 29, while a flanged portion 35 of the upper sealing block engages the lower surfaces of the block member 32. An upper bearing housing 36 has a flanged portion 37 fitting over the block member 32, and bolts 38 attach the bearing housing 36 to the upper port block section 29.

The bearing housing 36 has a central opening which receives a whipper shaft 42. In an enlarged part of the housing 36 are thrust bearings 40, and needle bearings 41 are in the central opening for rotatively supporting the whipper shaft 42. As illustrated, a flange 43 on the whipper shaft 42 is disposed between upper and lower thrust bearings 40 which contain the shaft between the bearing housing and the upper port block section and prevent longitudinal movement of the whipper shaft 42. The needle bearings 41 rotatively support the shaft relative to the bearing housing and provide longitudinal bearing supports for the shaft 42. A drive shaft 44 is supported by needle bearings 45 in upper and lower blocks 46 attached to the bracket 21. The drive shaft 44 is interconnected to the whipper shaft 42 by a spline connected drive coupling 47. The drive shaft 44 has a flanged portion 48 which is supported between thrust bearings 49 and contained by an upper bearing housing 50 attached to the upper block 46. A pulley and belt arrangement 51 is coupled to a variable hydraulic driving means 51a for supplying the motivating force for the drive shaft at selected, desired speeds. Coupled to the upper end of the drive shaft 44 is a tachometer pick-up 52 for indicating the speed of rotation.

The port block 29 (FIG. 2) has a central, stepped diameter opening which receives a sliding seal block arrangement 53 for sealing the shaft 42 relative to the upper port block 29. Referring to FIG. 4 where the seal block 53 is shown in more detail, the seal block 53 is comprised of an enlarged annular recess 54 in the upper port block 29 which receives an annular, floating seal member 55 having two spaced-apart external grooves for receiving O-rings 56 and three spaced-apart internal grooves for receiving O-rings 57. The upper end of the seal member 55 has a tapered outer surface 58 so that an O-ring 59 may be disposed in the corner of the recess 54. The seal member 55 is retained in the recess 56 by means of an annular sealing nut 60 threadedly received in the upper port block 29 and locked in place by a suitable pin 61. The sealing nut 60 has an enlarged, upwardly facing recess 62 which receives an O-ring 63, and a stepped portion of the seal member with an annular tapered surface 64 engages the O-ring 63. It will be appreciated from an inspection of FIG. 4 that the seal member 55 is supported for limited axial and transverse motion or is, in effect, "floating." Shaft 42 is hard flash chrome plated, and the floating seal member prevents undue or premature wearing on the shaft coating. In addition, replacement of the seals, when necessary, is easily accomplished.

Referring now to FIG. 3, the middle port block 30 is shown disposed between the upper sealing block 29 and lower port block 31. The upper port block 29 has a depending cylindrically shaped pin 67 which is received in a cylindrically shaped recess 68 in the middle port block 30. An O-ring seal 69 is provided between blocks 29 and 30. The lower port block 31 has a cylindrically shaped pin 70 which is received in a cylindrical recess 71 of the middle port block 30. An O-ring 72 is provided for sealing blocks 30 and 31 relative to one another.

The upper mixing barrel 24 is tubular and has an upper cylindrically shaped pin 73 which is received in a cylindrical recess 74 of the lower port block 31 and sealed with respect thereto by means of a suitable O-ring. The upper barrel 24 and the port blocks 29–31 are interconnected by means of fastening means such as bolts 24a (FIG. 1). The lower end of the upper barrel 24 is threadedly coupled at 75 to the upper end of the tubular, lower mixing barrel 25, and the barrels are sealed with respect to one another by means of a suitable O-ring. The lower end of barrel 25 is threadedly coupled at 76 to the adapter 26 and sealed with respect thereto by an O-ring. The lower end of the barrel adapter 26 has an annular recess 77 which receives an annular support ring 78, and a flange 79 on the discharge nozzle 27 abuts the ring 78. A flanged adapter nut 28 engages flange 79 and is threadedly coupled to the barrel adapter 26.

With respect to the interior of the mixer section 25, the middle port block 30 has a cylindrical opening 80, and the lower port block 31 has an outwardly diverging conically shaped wall 81 which is preferably at an angle of 17° with respect to the vertical. This angle should be within the range of 15° to 20°. The conically shaped wall 81 extends to the lower part of the lower port block 31 where it merges with the larger diameter, inner cylindrical wall 82 of the mixing barrel 24. Wall 82 has a uniform diameter throughout the length of the mixing barrel 24. The lower mixing barrel 25 has an inner cylindrical wall 83. Walls 82 and 83 have a uniform diameter throughout the length of the upper and lower mixing barrels 24 and 25. The barrel adapted 26 has an inner, inwardly diverging wall surface 84, and ring 78 and nozzle 27 have inner wall surfaces 85 and 86 which continue the slope of the wall 84 and merge with the cylindrically shaped wall surface 87 of the nozzle 27.

To summarize the internal wall surface configuration of the mixer, it includes a cylindrically shaped opening 80, an outwardly diverging wall 81, larger diameter cylindrically shaped walls 82 and 83, inwardly diverging wall surfaces 84, 85 and 86, and a cylindrically shaped discharge passage 87.

The whipper assembly 90 is received in the hollow chamber formed by the internal wall surfaces of the mixer. The whipper assembly, which is attached to the whipper shaft 42 by a threaded connection at 91, is supported for rotation by the seal bearing housing (FIG. 4) at its upper end, and by a lower bearing assembly 92 at its lower end.

The lower bearing assembly 92 includes the ring 78 which carries three equidistant and circumferentially spaced support arms 93(a–c) and a fairing member 94 with a conically shaped outer surface portion and a cylindrically shaped body portion 96. In the lower end of the whipper assembly 90 is a centrally located, stepped recess with a larger diameter opening slidably and rotatively receiving body portion 96, and needle bearings 97 in the opening rotatively mount the whipper assembly relative to the body 96. An O-ring 98 is located between the opening in the whipper assembly and body 96 to isolate the bearings and prevent build-up of foam product.

The whipper assembly 90 of the mixer includes a portion of shaft 42, an upper whipper part 99 and the lower whipper part 100. The lower whipper part 100 is threadedly coupled at 101 to the upper whipper part 99 which is disposed in barrel 24.

The upper whipper part 99 has an outwardly extending conically tapered outer surface 102 which begins at the upper end of the port block 31 and extends to the lower end of the port block. Preferably the angle of taper is 15° from the vertical and falls within a range of 13.5° to 19°, dependent upon the angle of wall 81. Coextensive with the wall surfaces 82, 83 of the barrels 24 and 25, the parts 99 and 100 have a cylindrical surface 103 so that an annular flow passage is formed between the barrel and whipper.

With respect to the conical wall sections 81 and 102 in the upper end of the block 31, the angles are such that the cross-section is increased by a linear change to give a constant linear change in velocity of fluid flow. Similarly, the walls 84 and 105 are interrelated to provide a constant decrease in the cross-sectional area.

The outer wall surfaces of the whipper assembly 90 thus include the cylindrical surface of shaft 42, the outwardly tapered surface 102 of part 99, the larger diameter cylindrical surface 103 of parts 99 and 100, and the inwardly tapered surface 105. Between the inner surfaces of the mixer and the outer surfaces of the whipper part, an annular flow passage is defined which begins with a first cross-sectional area in port block 30, a second, expanding cross-sectional area in the tapered portion, a third larger cross-sectional area along the mixer barrel, and a fourth decreasing cross-sectional area in the adapter 26. Pin means on the whipper, however, decrease the area along the mixer barrel. Insofar as the flow is concerned, it is desirable to have a uniform spacing between the inner walls of the mixer and the outer wall of the whipper assembly between the top of the mixer barrel 25 to the adapter 26.

With respect to the conical wall sections 84 and 105 along the adapter 26, the angles are similar to the angles of surfaces 81 and 102, so that there is a constant increase in velocity and a decreased cross-section. At the lower end of mixer 25, the conical walls 84–86 are converging, the angle of walls 84–86 being 15° and the angle of walls 104 and 95 being 13°. The angles provide for a constant increase in velocity. Thus, the flow path is narrowed somewhat at the adapter 26 to provide back-pressure to the flow of liquids therethrough.

The middle port block 30 has a perpendicularly arranged inlet port 108 through which a hydroxyl mixture can be supplied. By hydroxyl mixture, it is meant a resin, catalysts, silicone, castor oil, phosphoric acid, coloring and a fire retardant, if desired. Freon and/or nitrogen also can be injected into the mixture. These ingredients are commonly used in the production of polyurethane foam and can be premixed without precipitating a foaming reaction. The supply of the ingredients at a continuous predetermined flow rate fills the annulus between wall 80 and shaft 42 and enters into the expanding area between wall 81 and tapered surface 102. An inlet port 104 in the lower port block 31 is disposed along an axis perpendicular to a line along wall 81. A polyisocyanate such as "PAPI" (a registered trademark of the Upjohn Company) is injected through port 104 at a predetermined continuous flow rate and merges in the expanding area with the resin. The angle of injection is such that, together with the flow of resin, isocyanated or mixed isocyanate and resin are prevented from back-flowing towards the resin port 108.

Turning now to the mixer blade configuration, the whipper assembly 90 and the port blocks 30, 31, barrels 24, 25 and adapter 26 (hereinafter collectively referred to as the mixer housing) are illustrated in a plan view in FIG. 5, where the surfaces are laid out in the plane of the drawing for ease of illustration and explanation. In FIG. 5, the adjoining edge surfaces of the mixer housing are illustrated by the dash-dot-dot lines 115 and 116. The adjoining edge surfaces of the whipper assembly 90 are illustrated by the dash-dot lines 117 and 118. There are various sets of whipper pins having different configurations and arrangements along the length of the mixer. For convenience of illustration, the pins on the whipper assembly 90 are depicted in a solid shade, while the pins on the housing of the mixer are depicted in outline form. Several of the pin sections are shown in FIGS. 7–10.

In the mixer section, the whipper assembly 90 has, in longitudinal sequence, five horizontal rows 140–144 of pins which have a parallelogram shape in cross-section, four horizontal rows 145–148 of pins which have a cylindrical cross-section, two horizontal rows 149 and 150 of square shaped pins arranged with their diagonals parallel to the axis of the whipper assembly, and three horizontal rows 151–153 of square shaped pins arranged with two side surfaces parallel to the axis of the whipper assembly. The rows 140–147, 149, 151 and 153 of pins each have four pins equidistantly spaced around the circumference of the whipper assembly. The rows 148, 150 and 152 of pins each have eight pins equidistantly spaced around the circumference of the whipper assembly. As shown in FIG. 3, the pins are normal to the whipper assembly, i.e., the axis of each pin intersects the central axis of the whipper assembly, and each pin extends from the body of the whipper assembly to a point very close to the interior wall of the mixer housing.

In the mixer section, the mixer housing has, in longitudinal sequence, thirteen horizontal rows 160–172 of pins. Each horizontal row of pins contains four pins equidistantly spaced around the circumference of the mixer housing. As shown in FIG. 3, the pins extend normal to the mixer housing i.e., the axis of each pin intersects the central axis of the mixer housing, and each pin extends from the housing to a point very close to the wall of the whipper assembly. The pins of rows 160 and 164–172 are cylindrically shaped in cross-section, while the pins of rows 161–163 are square shaped in cross-section with two sides parallel to the central axis of the housing.

The rows of pins on the whipper assembly alternate with the rows of pins on the mixer housing, and the center-to-center spacing between pins in the rows is uniform.

The significance of the pin arrangement may best be understood by comparing relative drag coefficients of 1.0 for round pins, 1.9 for square shaped pins turned to present a diagonal to the fluid and 2.8 for square shaped pins with sides parallel to the whipper axis. What this means is that the turbulence increases as the drag coefficient increases.

Referring back to horizontal rows 140–144 on the whipper assembly, the pins of each row are in the form of a blade and there are four blades in each row. Considering row 140, blades 140(a–d) each have end sides aligned parallel to the axis of the whipper assembly. The inclination of each blade with respect to a horizontal line is 30° with blades 140a and 140c pitched in an opposite direction to the pitch of blades 140b and 140d. Blades 140a and 140c are diametrically opposed, as are blades 140b and 140d. The opposite pitch cancels out the turbine effect of the blades. The blades 141(a–d) of are similarly similarly similaarly arranged as the blades of row 140, except that the pitch of blades 141a and 141c is opposite to the pitch of blades 140a and 140c. Blades 141b and 141d are oppositely pitched relative to blades 140b and 140d. As illustrated, the relative pitch inclination of the individual blades of horizontal rows 140, 142 and 144 is similar with respect to corresponding, longitudinally aligned blades. The relative pitch inclination of individual blades of horizontal rows 141 and 143 is similar with respect to corresponding, longitudinally aligned blades. The effect of the pitch configuration is to make, for example, blades 140a and 141a converging and to make circumferentially adjacent blades 140b and 141b diverging. Thus, between each horizontal row of blades, circumferentially alternating converging and diverging flow paths are defined.

Near the bottom portion of the mixer barrel 24, pins 117c and 117d are formed into nozzles. As shown in FIG. 6, the pin 117c, which is typical, has a longitudinally extending hollow passageway 121 which extends through the pin 117c and a right angle outlet 122 arranged to inject into the mixture in the same direction as the direction of rotation of the whipper body. Nozzle pin 117c may, for example, be used to inject nitrogen, while a liquid blowing agent such as Freon may be injected in liquid form into the mixture via nozzle pin 117d after it has been violently mixed and after the temperature has been reduced somewhat since the PAPI and warmer resin have been intermixed, thereby reducing the temperature. This is significant since the Freon is introduced at a temperature of about 35°F., and it is desirable to have a minimum temperature spread to avoid undue flashing or gasification of the Freon.

In the mixer section 25 are longitudinally spaced opening 117c and 117d which are respectively located on a level with pin rows 162 and 163. The openings 117c and 117d may be blanked or receive fluid according to the dictates of the formulation mixing, which will hereafter be more fully explained.

For the production of a rigid polyurethane foam according to the present invention, a typical formulation would include a hydroxyl compound or resin, methylene chloride, castor oil and water, coloring, silicone, an acid catalyst, nitrogen, Freon and an amine catalyst which are mixed in the preblender and supplied to an isocyanate in the mixer. Additional Freon or a catalyst may be supplied through ports 117c or 117d.

In the operation of the foregoing described mixer, a resin mixture is injected through port 108 and feeds downwardly into an expanding area. The whipper assembly is rotated clockwise, and the shaft 42 is sealed with respect to the port block 30 by means of the floating seal. In the expanding area, PAPI is introduced normal to the flow of the resin mixture and is fed downwardly by the resin into the blade mixer section where a violent mixing action occurs, the blades being alternately pitched so as to avoid creating longitudinal hydraulic forces. Near the end of the blade mixer section, liquid Freon can be introduced in the same direction as the direction of rotation. Following dispersion of the blowing agent into the mixture, a relatively low action mixing section of round pins intermixes the vaporizable liquid into the resin and PAPI, followed by increased mixing action to the end of the pin sections where the converging flow path increases the velocity of mixture to the discharge nozzle to maintain the density of the liquid and keep the vaporizable liquid in solution until at least after discharge from the nozzle.

Summing up the features of the present invention, there is provided a continuous, streamlined flow path in which a first reactive hydroxyl mixture is injected at a first inlet. A second reactive isocyanate is injected into the hydroxyl flow in an expanding chamber. The reactive components are transversely sheared by meshing blades and pins where the blades have horizontally constricting and expanding areas and are inclined in opposite directions to offset forces on the liquid. Following substantial mixing of the components, Freon in liquid form can be supplied and subjected to a comparatively less violent transverse shearing and mixing section comprised of alternating cylindrically shaped pins. Subsequently, the mixing section utilizes square shaped pins oriented with diagonals parallel to the axis of the whipper assembly to increase the mixing action, and the mixing is finally completed by a further increase in the mixing action by use of square shaped pins arranged with two sides parallel to the axis of the whipper assembly.

The mixing is accomplished in a section of the flow path having a substantially uniform annulus formed between the mixer barrels and the whipper body. Supply of the Freon is at a location close to the whipper body where the velocity is less as compared to the velocity near the mixer wall. The mixed liquids are converged via a conical flow path to a cylindrically shaped outlet orifice. The whipper body and lower bearing support have an insert arrangement whereby the whipper and bearing support provide a substantially uniform surface, and there is little room available for build-up of materials on the bearing support. At the supply point for the hydroxyl, the rotating shaft is provided with a floating seal which eliminates wear on the shaft surface and is easily replaceable.

Relative to the construction of a mixer embodying the present invention, the overall internal diameter may be 3.25 inches and the outer diameter of the whipper may be 1.875 inches. It is desired to keep the diameter of the whipper means within 20 to 40 percent of the barrel diameter. The pin cross-section is 0.25 inch in diameter or length of side. For a 3-inch I.D. barrel, a 3/16-inch pin would be used, and for a 4½ to inch I.D. barrel, a ⅜-inch pin would be used. The pins are welded in place or can be removably inserted by threaded connections. The spacing between adjacent pin centers on the housing and whipper is about 0.875 inch. This spacing desirably should be between 0.625 and 1 inch or 45° to 80° of the pin diameter. The clearance between adjacent pins should be on the order of 75 percent of a pin diameter. If the clearance is too great, the shearing action will not be effective. In general, the annulus defining the flow passage is a function of the viscosity of the fluids. That is, for higher viscosity fluids, the annulus should be larger than for lower viscosity fluids. The speed of rotation is similarly a function of viscosity, the more viscous fluids being agitated at lower speeds than the less viscous fluids. The surfaces defining the flow path are preferably hard flash chrome plated to avoid chemical reaction. The design of the flow path is arranged to minimize the tendency for an internal build-up of reacting foam. A typical temperature increase of 10°F. may be expected from the heat generated due to mixing. The blades of rows 140–145 may range from one-eighth × three-sixteenths inch to one-eighth × five-sixteenths inch for typical cross-section dimensions. In the design of port 108, it generally has the same cross-section as the annulus between the shaft 42 and opening 54.

The hold-up time through the mixer can be very short — as little as one-half of a second. This is typically determined by the input volume and the volume of the flow path.

The two piece whipper assembly 90 with upper and lower parts 99 and 100 corresponds to the two piece barrel assembly of barrels 24 and 25. The advantage of this construction is that a longer lower barrel and longer whipper part 100 can easily be substituted to provide a longer mixer. Hence, a longer delay time can be provided to increase mixing time for any given formulation.

With respect to the ring 78, it has three support arms 93(a–c) as noted heretofore. The support arms are generally rectangular and are inclined at an angle with respect to the vertical. The shape of the arm is streamlined. The pitch angle of the arms is selected in accordance with the swirl angle of the fluids to minimize turbulence of the liquid as it is discharged. Typically, an angle of 20° is satisfactory for light fluids, while the angle for a highly viscous fluid might be 8°.

In summary of the fore-going apparatus and methods, there is an upper and a lower hollow closed chamber defined by the various blocks and barrels. Rotatively mounted in the chambers is a whipper assembly which defines, in connection with wall surface of the chamber, a flow path or passageway. The flow path in the upper chamber includes an annular passage into which a resin is injected and an outwardly extending conically shaped passage which increases in cross-section from the annular passage to a second, larger diameter annular passage. Midway along the conically formed path, an inlet port for isocyanate is provided which is perpendicular or normal to a line along the conical surface of the chamber. In a larger diameter annular flow path there are four longitudinal rows of mixing pins which are equidistantly spaced about a circumference and respectively disposed on the chamber and on the whipper assembly. The pins alternate along the length of the chamber respectively between positions on the whipper assembly and positions on the chamber. On the whipper assembly a first set of pins has a parallelogram cross-section arranged to alternate lengthwise between opposite directions of inclination, so that adjacent blades have alternately converging and diverging facing surfaces. This arrangement provides for violent mixing. Near the end of the blade section, an alternate inlet port is provided in a chamber pin for the injection of a blowing agent, if desired or necessary.

Following the blade section, the pins are cylindrical in cross-section on the whipper assembly. The next section of pins on the whipper assembly are square shaped but have a diagonal dimension arranged parallel to the axis of the whipper body. The final section of pins are square shaped with two sides parallel to the axis of the whipper assembly. whipper The effect of the pin configurations is to selectively increase the whipping and mixing action.

Following the pin sections, the flow path converges from a larger cross-section to a smaller cross-section of annular flow path and passes to a cylindrical discharge opening. With respect to the pin section along the whipper, a number of horizontal sets of pins on the whipper assembly include eight pins to increase the mixing action at that particular section.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method of commingling liquid materials having different viscosities to provide a substantially homogeneous mixture, comprising
introducing said materials into a stream flowing along an annular passageway, different ones of siad materials being introduced into said passageway at different locations therealong,
transversely shearing said stream at a plurality of locations along its path with pin-like members having cross-sectional configurations which are different at different locations such that the mixing and shearing action exerted on said stream progressively increases during its flow along said annular passageway.

2. A process according to claim 1 in which the liquid materials which are commingled are the reactants for producing a polyurethane foam where liquid hydroxyl mixture and liquid isocyanate are introduced at first and second locations in said annular pathway, and the stream of mixed components is subjected to transverse shearing by transversely intersecting said stream with a series of pin-like members, the first of which members have a cylindrical cross-section, the next series of which members have a square cross-section with diagonals aligned parallel to the direction of travel of the said stream, and the final series of pin-like members have a square cross-section with sides aligned parallel to the direction of travel of the said stream.

3. The process of claim 2 in which blowing agent is introduced into the stream flowing along said annular passageway at a third location downstream of said first and second location, said third location being prior to the point at which the stream is transversely sheared by said pin-like members.

* * * * *